United States Patent
Mathew

(10) Patent No.: US 6,327,484 B1
(45) Date of Patent: Dec. 4, 2001

(54) WIRELESS COMMUNICATIONS DEVICE HAVING INTEGRAL LASER POINTER

(75) Inventor: Siby V. Mathew, Plano, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/410,468

(22) Filed: Oct. 1, 1999

(51) Int. Cl.$^7$ .................................................. H04B 1/38
(52) U.S. Cl. ........................ 455/575; 455/90; 455/556; 343/702
(58) Field of Search ............................... 455/66, 575, 90, 455/550, 556–557, 572, 128–129, 351, 347; 379/428, 433; 343/702, 703, 701; 359/27, 152

(56) References Cited

U.S. PATENT DOCUMENTS

| | | | |
|---|---|---|---|
| 5,786,106 | * | 7/1998 | Armani .................................. 429/98 |
| 6,144,341 | * | 11/2000 | Kraz .................................... 343/703 |
| 6,169,520 | * | 1/2001 | Anderson ............................. 343/701 |

* cited by examiner

Primary Examiner—Doris H. To
(74) Attorney, Agent, or Firm—Ericsson Inc.; Roger S. Burleigh

(57) ABSTRACT

A wireless communications device, such as a "cellular" telephone, including telephony circuitry, laser pointer circuitry, and a battery, wherein the telephony circuitry and the laser pointer circuitry are couplable to the battery. The widespread and everyday use of cellular telephones means that it is unlikely that a person would forget their telephone. Therefore, by integrating a laser pointer in a cellular telephone, it is unlikely for such person to ever be without a laser pointer. Furthermore, if that person forgets or loses their telephone, it may be possible to locate by placing a call to it, thereby also locating the laser pointer. Because a cellular telephone can be easily shared with others, so can a laser pointer integrated therewith. The integration of a laser pointer in a cellular telephone also eliminates the need for a special recharging device for the batteries used in conventional laser pointers, since the integral laser pointer can receive power from the cellular telephone battery.

15 Claims, 2 Drawing Sheets

WIRELESS COMMUNICATIONS DEVICE HAVING INTEGRAL LASER POINTER

TECHNICAL FIELD OF THE INVENTION

The present invention is directed, in general, to wireless communications devices and, more specifically, to a mobile telephone having an integral laser pointer.

BACKGROUND OF THE INVENTION

The world is currently experiencing revolutionary changes in communications systems, brought about, in part, by the general availability of access to, and evolution of, wireless telephony systems. It has been predicted that wireless telephony will eventually replace much of the existing wireline telephony systems; the period during which that will occur, however, is likely to be a function of the ability of wireless telephony systems to provide the features that subscribers have come to expect from wireline systems.

The proliferation of wireless telephony devices has been accompanied by the advent of mobile, or "notebook," computers and many other electronic devices, many of which have become virtually indispensable to certain persons. For example, traveling sales people can create a multimedia presentation on an office computer and then present it to prospective customers using a laptop computer. Such presentations can also be projected onto a large screen using a portable video projector.

Another useful electronic tool is a "laser pointer." Conventional laser pointers are housed in a pen-like device. Although such conventional laser pointers are easily transported, they are also subject to being easily lost or forgotten. One attempt to solve this problem is disclosed in U.S. Pat. No. 5,838,639, issued to Hsien-Jung Hwang (the '639 Patent), incorporated herein by reference. In the '639 Patent, a laser pointer is integrated with a watch; the patentee therein states that a user may readily carry the laser pointer without it being lost or forgotten. Although the laser pointer disclosed in the '639 Patent may be less likely to be lost or forgotten, the placement of the laser pointer on the wrist of a user may render the pointer difficult to use. Moreover, if the laser pointer is strapped to a user's wrist, it cannot be easily shared with others.

Conventional laser pointers are powered by batteries, which may or may not be rechargeable. For environmental reasons, it is preferable to use rechargeable batteries. Because the broad range of today's electronic devices use so many different types and sizes of batteries, however, it is impractical to transport special recharging devices for each type of battery a user might have. Thus, it is desirable to reduce the number of recharging devices needed by users of various electronic devices.

Accordingly, there is a need in the art for a laser pointer that is not easily forgotten or lost, that can be easily shared with others, and which eliminates the need for a special recharging device.

SUMMARY OF THE INVENTION

To address the above-discussed deficiencies of the prior art, the present invention provides a wireless communications device, such as a "cellular" telephone, including telephony circuitry, laser pointer circuitry, and a battery, wherein the telephony circuitry and the laser pointer circuitry are couplable to the battery. The widespread and everyday use of cellular telephones means that it is unlikely that a person would forget their telephone. Therefore, by integrating a laser pointer in a cellular telephone, it is unlikely for such person to ever be without a laser pointer. Furthermore, if that person forgets or loses their telephone, it may be possible to locate by placing a call to it. Because a cellular telephone can be easily shared with others, so can a laser pointer integrated therewith. The integration of a laser pointer in a cellular telephone also eliminates the need for a special recharging device for the batteries used in conventional laser pointers, since the integral laser pointer can receive power from the cellular telephone battery.

In one embodiment, power conversion circuitry is provided to convert a voltage provided by the battery to a voltage suitable to power the laser pointer circuitry. This is only necessary if the power requirements of the laser pointer circuitry are different than that provided by a battery used by the wireless communications device.

In the embodiment described hereinafter, the laser pointer circuitry includes a laser diode that emits a substantially coherent beam of visible light. In a related embodiment, the wireless communications device includes a helical antenna, and the laser diode is disposed proximate a central axis of the antenna, whereby the substantially coherent beam of visible light is emitted from an end portion of the helical antenna. The helical antenna can be surrounded by a protective housing having a portion through which the substantially coherent beam of visible light is emitted. If necessary, the portion through which the substantially coherent beam of visible light is emitted can include an optical lens to focus and concentrate the beam of light.

The wireless communications device can also include a switch for selectively-enabling the laser pointer circuitry. The switch can be either a dedicated switch, or can be a multi-function switch used to control other features of the wireless communications device. Alternatively, or in addition, the wireless communications device can include automatic deactivation circuitry that disables the laser pointer circuitry when the telephony circuitry is in a transmission mode. By disabling the laser pointer circuitry during periods of active use of the telephony circuitry, the peak power demand placed on the battery can be minimized.

Also disclosed is a dual-purpose antenna structure for use with a wireless communications device. The dual-purpose antenna structure includes an antenna element and laser pointer circuitry operative to emit a substantially coherent beam of visible light. The dual-purpose antenna structure makes it possible to offer a wireless communications device with or without a laser pointer option, provided the main structure of the device includes an antenna mount adapted to properly interface with the dual-purpose antenna structure; i.e., the antenna mount includes electrical contact portions for electrically coupling the antenna element and the laser pointer circuitry to the wireless communications device.

In a specifically-described embodiment of the dual-purpose antenna structure, the antenna element is helical. In a related embodiment, the laser pointer circuitry includes a laser diode disposed proximate a central axis of the helical antenna, whereby the substantially coherent beam of visible light is emitted from an end portion of the helical antenna. A protective housing can be provided to surround the antenna element and the laser pointer circuitry. A protective housing has a portion, which may include an optical lens, through which the substantially coherent beam of visible light is emitted. The dual-purpose antenna structure can also include power conversion circuitry operative to convert a voltage provided by a battery associated with the wireless communications device to a voltage suitable to power the laser pointer circuitry.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which.

DETAILED DESCRIPTION

Figure 1:
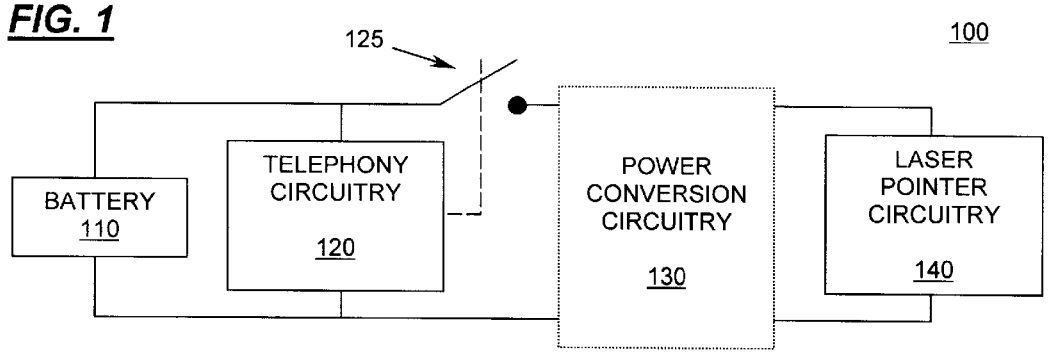
FIG. 1 illustrates an exemplary functional schematic for a mobile telephony device having an integral laser pointer.

Referring to FIG. 1, illustrated is an exemplary functional schematic for a mobile telephony device 100 having an integral laser pointer. The mobile telephony device 100 includes conventional telephony circuitry 120 that receives electrical power from a battery 110. The laser pointer circuitry 140 is selectively coupled to the battery 110 by a switch 125. Power conversion circuitry 130 may also be included if the voltage rating of the battery 110 does not meet the input voltage requirement of the laser pointer circuitry 140. Those skilled in the art are familiar with the use of power conversion circuitry to modify a source of power to meet the requirements of specific electronic circuits; the principles of the present invention are not limited to a specific power conversion circuit, such circuit being selectable by those skilled in the art to meet the specific requirements of the chosen laser pointer circuitry. Furthermore, the principles of the present invention are not limited to specific laser pointer circuit.

In a preferred embodiment, the switch 125 is controllable as a function of a mode of operation of the telephony circuitry 120. For example, to reduce the peak power requirements of the battery 110, it may be desirable to disable the operation of the laser pointer circuitry 140 during periods of peak power demand by the telephony circuitry 120, such as when the mobile telephony device 100 is in use and requires additional power for signal transmission purposes.

Figure 2:
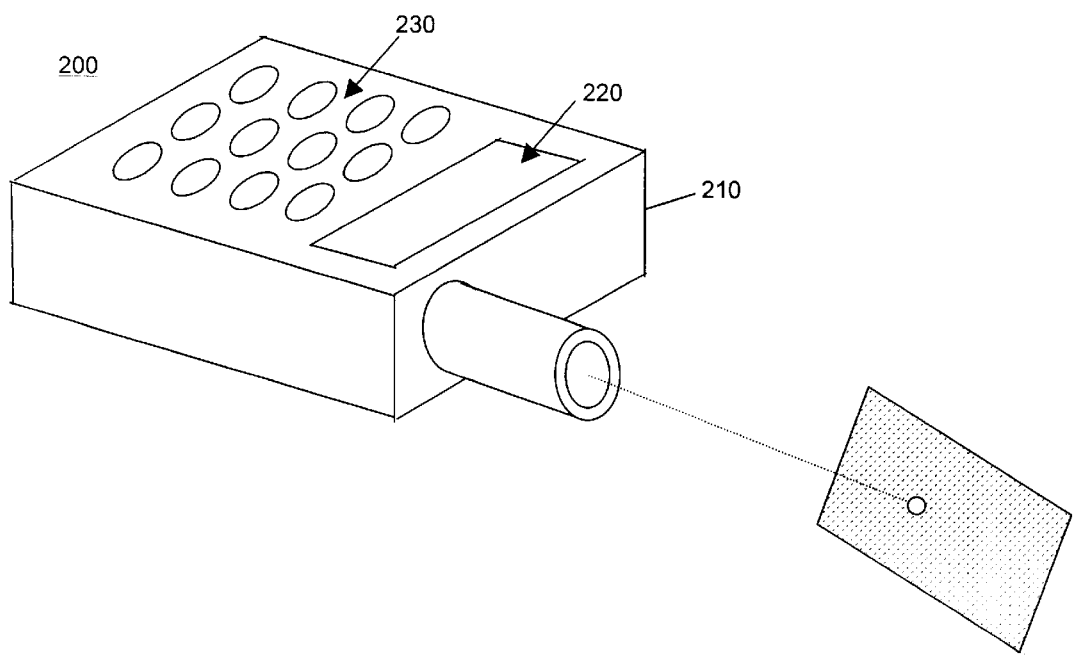
FIG. 2 illustrates an exemplary mobile telephone having an integral laser pointer.

Referring now to FIG. 2, illustrated is an exemplary mobile telephony device 200 having an integral laser pointer. The exemplary mobile telephony device 200 includes a housing 210 in which telephony and laser pointer circuitry (such as that illustrated in FIG. 1) is provided. The mobile telephony device 200 has a user interface that includes a display 220 and a keypad 230. The telephony and laser pointer circuitry are powered by a rechargeable and replaceable battery 140.

The keypad 230 includes a plurality of keys, one of which is used to control the switch 125 used to enable the laser pointer circuitry 140; the key used to control the operation of the laser pointer circuitry 140 can be either dedicated to such operation, or can be a multi-function key used to control other various functions of the mobile telephony device 200 based on a mode of operation thereof. Upon enabling the laser pointer circuitry 140, a coherent beam of light exits an aperture in the mobile telephony device 200 and illuminates a small region of a remote surface.

Figure 3:
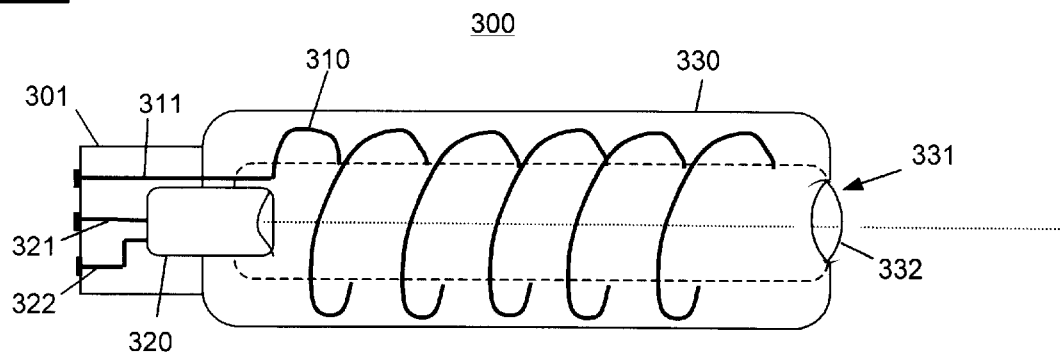
FIG. 3 illustrates a cross-sectional view of an exemplary dual-purpose antenna structure according to the principles disclosed herein.

Turning now to FIG. 3, illustrated is a cross-sectional view of an exemplary dual-purpose antenna 300 according to the principles disclosed herein. The dual-purpose antenna 300 includes an antenna element 310 and a laser diode 320 operative to emit a substantially coherent beam of visible light. In the exemplary dual-purpose antenna 300, the antenna element 310 is helical and the laser diode 320 is disposed proximate a central axis of the helical antenna, whereby the substantially coherent beam of visible light is emitted from an end portion of the helical antenna. A protective housing 330 surrounds the antenna element 310, and includes an aperture 331 through which the substantially coherent beam of visible light is emitted; an optical lens 332 can be located within the aperture 331, if necessary to focus and concentrate the beam of visible light.

The dual-purpose antenna 300 makes it possible to offer a wireless communications device with or without a laser pointer option, provided the main structure of the device includes an antenna mount adapted to properly interface with the dual-purpose antenna structure; i.e., the antenna mount includes electrical contact portions for electrically coupling the antenna element 310 and the laser diode 320 to the wireless communications device. As illustrated in FIG. 3, the dual-purpose antenna 300 includes a base portion 301 for interfacing with an antenna mount of a wireless communications device. An electrical contact 311 extends through the base portion 301 for coupling the antenna element 310 to the telephony circuitry within the wireless communications device. Electrical contacts 321 and 322 also extend through the base portion 301 for coupling the laser diode 320 to power and laser pointer circuitry within the wireless communication device. Although not illustrated in FIG. 3, the laser pointer circuitry used to drive the laser diode 320 can also be housed within the dual-purpose antenna 300 if property packaged. Furthermore, power conversion circuitry (not shown) can be provided within the dual-purpose antenna 300; as described above, power conversion circuitry may be necessary to convert a voltage provided by a battery associated with the wireless communications device to a voltage suitable to power the laser pointer circuitry.

Figure 4:
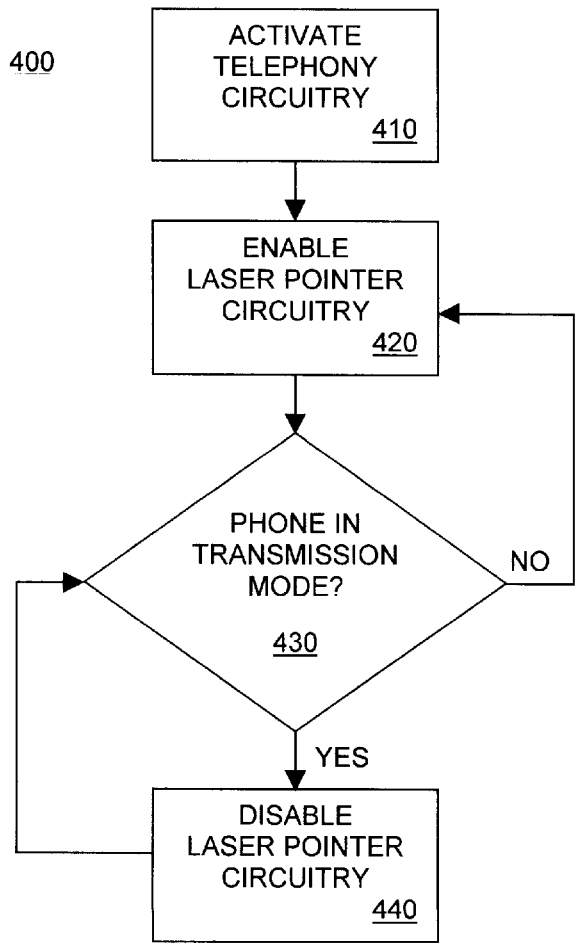
FIG. 4 illustrates an exemplary method of operation for a wireless communications device having an integral laser pointer.

Finally, reference is made to FIG. 4, which illustrates an exemplary method of operation 400 for a wireless communications device having an integral laser pointer. In a Step 410, the telephony circuitry of the wireless communications device is activated. As with a conventional wireless communications device, the telephony circuitry is generally activated upon a user turning on power for the device. Next, in a Step 420, the laser pointer circuitry is enabled, allowing a user to selectively turn on the laser pointer. In a Step 430, it is determined whether the telephony circuitry is in transmission mode. Generally, when a wireless communications device is in transmission mode, such as during a voice call, the telephony circuitry draws significantly more power from the battery. Thus, if the wireless communications device goes into transmission mode, the laser pointer circuitry is disabled in Step 440. The transmission mode is continually monitored, at least on a sufficiently frequent periodic basis, and, if the wireless communications device is no longer in transmission mode, the laser pointer circuitry is again enabled in Step 420.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. A wireless communications device, comprising:

telephony circuitry;

laser pointer circuitry comprises a laser diode, operative to emit a substantially coherent beam of visible light;

a helical antenna, said laser diode disposed proximate a central axis of said antenna, whereby said substantially coherent beam of visible light is emitted from an end portion of said helical antenna; and a battery, said telephony circuitry and laser pointer circuitry being couplable to said battery.

2. The wireless communications device recited in claim 1, further comprising power conversion circuitry, said power conversion circuitry operative to convert a voltage provided by said battery to a voltage suitable to power said laser pointer circuitry.

3. A wireless communications device recited in claim 1, further comprising a protective housing surrounding said helical antenna, said protective housing including a portion through which said substantially coherent beam of visible light is emitted.

4. The wireless communications device recited in claim 3, wherein said portion through which said substantially coherent beam of visible light is emitted comprises an optical lens.

5. The wireless communications device recited in claim 1, further comprising a switch for selectively-enabling said laser pointer circuitry.

6. The wireless communications device recited in claim 1, further comprising automatic deactivation circuitry, said automatic deactivation circuitry operative to disable said laser pointer circuitry when said telephony circuitry is in a transmission mode.

7. A dual-purpose antenna structure for use with a wireless communications device, said antenna structure comprising:

an antenna element; and laser pointer circuitry operative to emit a substantially coherent beam of visible light.

8. The antenna structure recited in claim 7, wherein said antenna element is helical.

9. The antenna structure recited in claim 8, wherein said laser pointer circuitry comprises a laser diode disposed proximate a central axis of said helical antenna, said substantially coherent beam of visible light being emitted from an end portion of said helical antenna.

10. The antenna structure recited in claim 9, further comprising a protective housing surrounding said antenna element and said laser pointer circuitry, said protective housing including a portion through which said substantially coherent beam of visible light is emitted.

11. The antenna structure recited in claim 10, wherein said portion through which said beam of visible light is emitted comprises an optical lens.

12. The antenna structure recited in claim 7, further comprising a base member to which said antenna element and said laser pointer circuitry are mounted, said base member including means for coupling said antenna structure to said wireless communications device.

13. The antenna structure recited in claim 12, wherein said base member includes electrical contact portions for electrically coupling said antenna element and said laser pointer circuitry to said wireless communications device.

14. The antenna structure recited in claim 12, wherein said means for coupling said antenna structure to said wireless communications device comprises an externally-threaded portion.

15. The antenna structure recited in claim 7, further comprising power conversion circuitry, said power conversion circuitry operative to convert a voltage provided by a battery associated with said wireless communications device to a voltage suitable to power said laser pointer circuitry.

\* \* \* \* \*